United States Patent [19]

Simons et al.

[11] Patent Number: 4,798,152

[45] Date of Patent: Jan. 17, 1989

[54] DYNAMIC TEST SYSTEM FOR SEWING THREADS

[75] Inventors: Frank H. Simons; Benjamin A. Ferguson, both of Charlotte, N.C.

[73] Assignee: Celanese Fibers, Inc., New York, N.Y.

[21] Appl. No.: 78,423

[22] Filed: Jul. 27, 1987

[51] Int. Cl.[4] ............... D05B 81/00; D05B 79/00
[52] U.S. Cl. ........................ 112/262.1; 112/121.11; 112/278; 73/160
[58] Field of Search .......... 112/262.1, 121.11, 121.12, 112/273, 278, 270, 2; 73/160, 159

[56] References Cited

U.S. PATENT DOCUMENTS

| 4,188,893 | 2/1980 | Shimazaki | 112/121.11 |
| 4,612,867 | 9/1986 | Rosch et al. | 112/262.1 |
| 4,648,054 | 3/1987 | Farah | 73/160 |
| 4,660,484 | 4/1987 | Yasui | 112/121.11 X |

FOREIGN PATENT DOCUMENTS 2136564  9/1984  United Kingdom ............... 112/278

Primary Examiner—Peter Nerbun
Attorney, Agent, or Firm—Forrest D. Stine

[57] ABSTRACT

A fiberoptic bundle has one end disposed in the bed of a sewing machine in opposition to the stitch formation region below the throatplate. A strobe light for periodically illuminating the region and a camera for recording visual images of the region are coupled to the opposite end of the fiberoptic bundle. The end of the fiberoptic bundle within the sewing machine bed may be provided in guidepaths for viewing the stitch formation region from different viewing directions, preferably 90° apart. A load cell is disposed on the side of the sewing machine for recording tension transients in the thread en route to the needle.

15 Claims, 3 Drawing Sheets

DYNAMIC TEST SYSTEM FOR SEWING THREADS

BACKGROUND OF THE INVENTION

The present invention relates to instrumentation and methods for visually recording the formation of stitches and recording certain characteristics of the threads in a sewing machine environment and particularly relates to instrumentation and methods for viewing loop formation under the throatplate of a sewing machine and transient tension characteristics of the thread as it is stitched into a fabric.

Repeatable and effective needle loop formation is mandatory for good sewability and very important in maintaining sewing efficiency. The size and shape of the needle loop formed and the angle that is formed by the thread in relation to the needle are characteristics that vary from one thread type to another. While needle loop formation is also dependent on other factors, skipped stitches will occur if the loop is not properly formed.

At present, the dynamic performance of threads in a sewing machine environment, particularly in the formation of stitches, has not been observed in view of the high-speed operation of the various elements which cooperate in the sewing machine to form the stitch in the confined area in which the stitches are formed. The physical properties of threads, of course, can be determined by their static properties. However, the success or failure of a particular thread in a sewing machine is determined not by static properties but by the dynamic properties of the thread and its ability to form proper loops. Under present conditions, a thread either breaks or not and a comparison of the performance characteristics of various threads in a dynamic sewing machine environment simply cannot be obtained. For example and as indicated previously, loop formation as part of the ultimate formation of a stitch is critical for performance and is not capable of being adequately predicted by the physical properties of the thread inasmuch as loop formation is a dynamic rather than static function.

Furthermore, thread tension while sewing is an important factor. Current practice is to set the tension while winding thread through the sewing machine at very low speed and assume that the tension increase at sewing speeds is the same for all threads. This, however, is quite unlikely. Difficulties have previously been experienced in measuring more than the average level of tension on the thread, i.e., the peaks and valleys of tension transients have not readily been ascertained.

According to the present invention, instrumentation is provided to observe and record various features of thread movement in the critical area of a sewing machine, that is, the area below the throatplate where the stitching, including loop formation, occurs. By being able to visually observe and record thread movement in this area, as well as to accurately record the magnitude of tension transients alone or in conjunction with the visual observation, it is possible to compare the performance of different types of threads. For example, with the instrumentation system of the present invention, flexibility, dynamic bending modulus, lubricity, stick slip, core versus wrapper problems, consistency, as well as range of movement, and effect of tension can all be examined in relation to the physical properties of the thread and its construction. Controlled and accurate fabric and thread feed will thus allow both repeatability and optimization. With respect to the measurement of tension transients, the present instrumentation is able to record, during the about seven millisecond needle stroke, tension transients which can be displayed on an oscilloscope or recorded on magnetic tape and analyzed.

According to the present invention, there is provided a fiberoptic bundle for reception in a guide path or guide way formed in the sewing machine bed whereby the end of the fiberoptic bundle terminates adjacent to or in the region to be observed. That is, the end of the fiberoptic bundle terminates adjacent the region of loop formation below the throatplate in the bed of the sewing machine. The fiberoptic bundle is multi-channelled and includes a pair of channels for transmitting light into the region to be observed. Because this region is substantially fully enclosed, an extremely high intensity of light is required, particularly considering the high frequency of the moving parts, on the order of 3,000 to 9,000 cycles per minute. Thus, a high intensity arc strobe light is coupled at the end of the fiberoptic bundle external to the sewing machine whereby stroboscopic light is transmitted through the fiberoptic bundle to illuminate the region desired to be observed. Another channel of the fiberoptic bundle transmits light from the region to a monitoring and recording system. For example, the monitoring system may include a low-light camera. Thus, by adjusting the frequency of the strobe light, the movements of the elements of the sewing machine including the threads for forming the stitch, can be observed, recorded, and played back more slowly.

It will be appreciated that, because of the nature of the stitching action, an accurate or complete observation of the stitch-forming process requires observation from at least two directions, preferably about 90° apart, and preferably from three directions, whereby the opposite sides of the needle and thread carried thereby can be observed, as well as the action of the looper from a direction intermediate such opposite directions. The light guide pathways are therefore formed in the bed of the sewing machine to enable observations of the loop formed by the needle as it moves below the fabric, the loop capture by the looper, and their cooperation to form the stitching. Consequently, such guide ways or guide paths are preferably three in number, two 180° apart and the third at 90° relative to each of the other guide paths.

Preferably, a tension measuring load cell is secured to the side of the sewing machine. The thread passes over a pair of spaced pins between which is provided a cantilevered pin forming part of the tension measuring load cell. Because of the high frequency response of the load cell, tension transients may be measured and correlated with the movement of the thread as observed in the stitch formation region by the video camera.

Accordingly, and in accordance with one embodiment of the present invention, there is provided, in a sewing machine having a bed, a throatplate carried by the bed for receiving a reciprocable needle and thread carried thereby, and a mechanism disposed below the throatplate for cooperating with the needle and thread to form a stitch, apparatus for viewing the region of stitch formation in the bed below the throatplate comprising fiberoptic means carried by the bed for transmitting light into the region to be viewed and conveying light from the region. A strobe light is coupled to the fiberoptic means for periodically illuminating the region through the fiberoptic means. Means are coupled to the fiberoptic means for producing a dynamic image of the region illustrating the movement of the threads, needle and looper when forming the stitch.

Preferably, means for measuring tension transients on the thread during reciprocating motion of the needle carrying the thread are provided. Such means include a load cell having a cantilevered beam in contact with the thread and serving as an electromechanical transducer.

Accordingly, it is a primary object of the present invention to provide instrumentation and methods for determining the performance characteristics of thread in a sewing machine under dynamic operating conditions. It is also a feature of the present invention that the instrumentation is readily adaptable to the wide variety of existing sewing machines, with little or no modification to the machines and no interference with normal operation.

These and further objects and advantages of the present invention will become more apparent upon reference to the following specification, appended claims and drawings.

BRIEF DESCRIPTION OF THE DRAWING FIGURES

Figure 3:
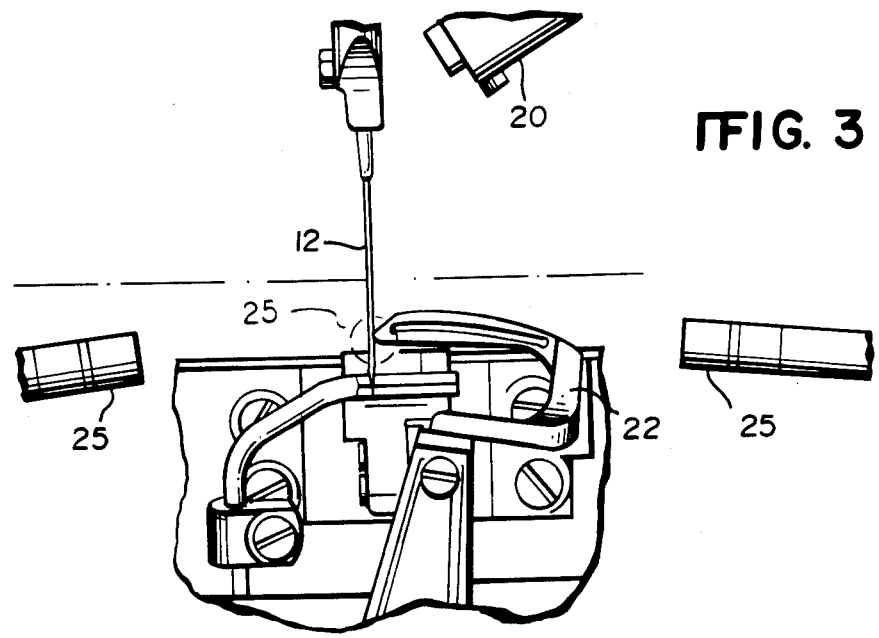
FIG. 3 is an enlarged fragmentary front elevational view of the mechanism illustrated in FIG. 2.
Figure 5:
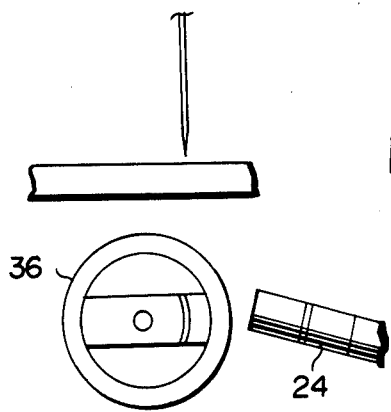
Figure 6:
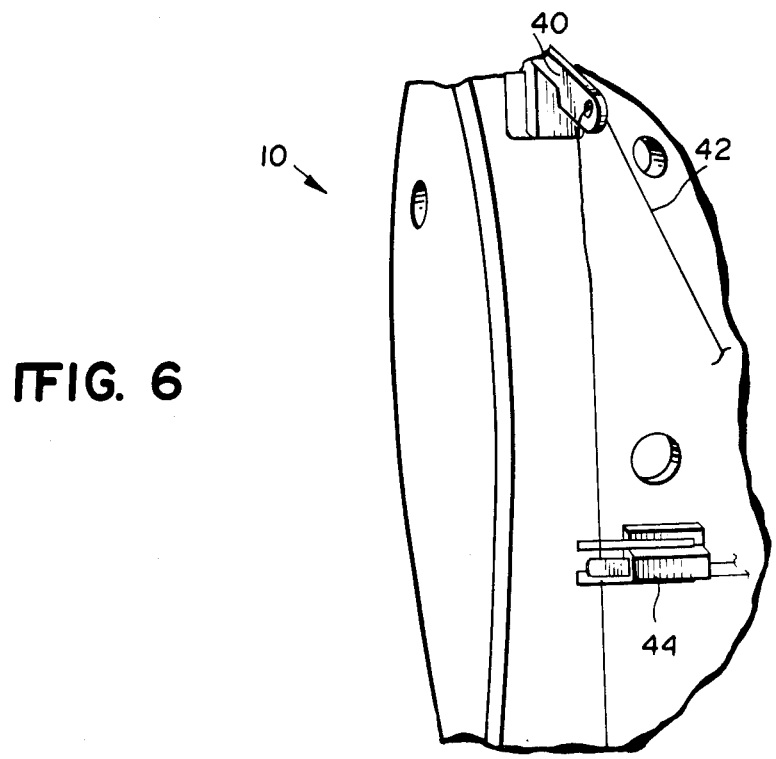

FIG. 5 is a fragmentary schematic illustration similar to FIG. 3 of the dynamic test system hereof as applied to a sewing machine using a bobbin for forming, for example, lock stitches; and FIG. 6 is a fragmentary perspective view of the side of the sewing machine illustrating a tension measuring device applied to the thread at a location just prior to the engagement of the thread with the sewing machine needle.

DETAILED DESCRIPTION OF THE DRAWING FIGURES

Reference will now be made to the present preferred embodiment of the invention, an example of which is illustrated in the accompanying drawings.

Figure 1:
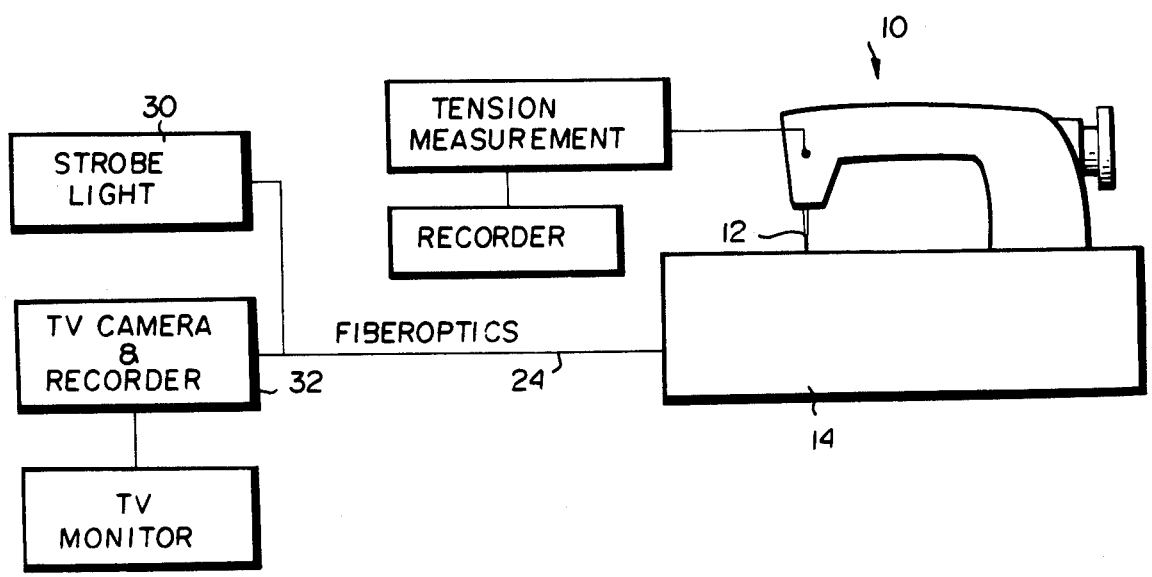
FIG. 1 is a schematic block diagram illustrating a dynamic test system for sewing threads constructed in accordance with the present invention.

Referring now to FIG. 1, there is illustrated a conventional sewing machine, generally designated 10, having a needle 12 mounted for reciprocating movement for forming stitches along a fabric disposed on the top of the base or bed 14, all in a conventional manner. Except as otherwise indicated herein, the sewing machine is of a conventional type and its various parts and operation need not be described or illustrated herein, as they are apparent to those skilled in this art. Suffice to say that the needle 12 and thread carried thereby passes through the fabric and throatplate of the machine, the needle carrying the thread which cooperates with additional thread carried by a loop taker or looper within the base or bed to form stitches, i.e., chain stitches, in the work piece. It is the action of the needle carrying the thread, together with the loop taker and its thread, which is desired to be observed and recorded, as well as the recordation of the tension transients on the thread carried by the needle, all in accordance with the present invention.

Figure 2:
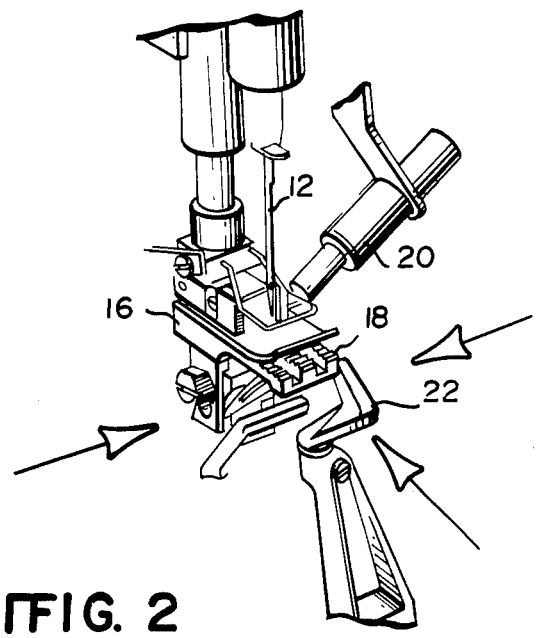
FIG. 2 is a fragmentary perspective view, with parts broken out for clarity of the throat of a sewing machine illustrating the action of the sewing needle and a looper below the throatplate.

To enable proper orientation, reference is made to FIG. 2, wherein the throatplate is designated 16, on which dogs 18 are provided for advancing fabric along the throatplate through which the needle 12 reciprocates. A needle cooler is indicated at 20 and a looper at 22. The looper oscillates about an axis, not shown, and conducts a looper thread through the loops formed by needle 12 and the thread carried thereby in a manner which is well known in the sewing machine art. It will be appreciated by those skilled in this art that the action of the needle, looper and threads is such as to preclude unaided visual observation and, indeed, because of the high speed of reciprocation of these parts and the movement of the threads, visual observation has not heretofore been accomplished in this critical area below the throatplate of the sewing machine in a manner enabling analysis and securement of useful information.

Referring back to FIG. 1, at least one fiberoptic cable or bundle 24 is provided and preferably comprises two light channels for transmitting light into the sewing machine bed and an image channel for transmitting the image out of the sewing machine bed. The fiberoptic bundle 24 terminates in a head 25 (FIG. 3) disposed in the sewing machine bed 14 adjacent the critical area to be observed. For example, as illustrated in FIG. 3, the fiberoptic bundle terminates in a head 25 disposed on one side or the other, or both, of the area or region where needle 12 and looper 22 cooperate to form stitches. Additionally, borescope head 25 may terminate at right angles to the plane of oscillation of looper 22, i.e., looking from the front toward the rear of the sewing machine in the area of the formation of the loop and, hence, the stitches.

Figure 4:
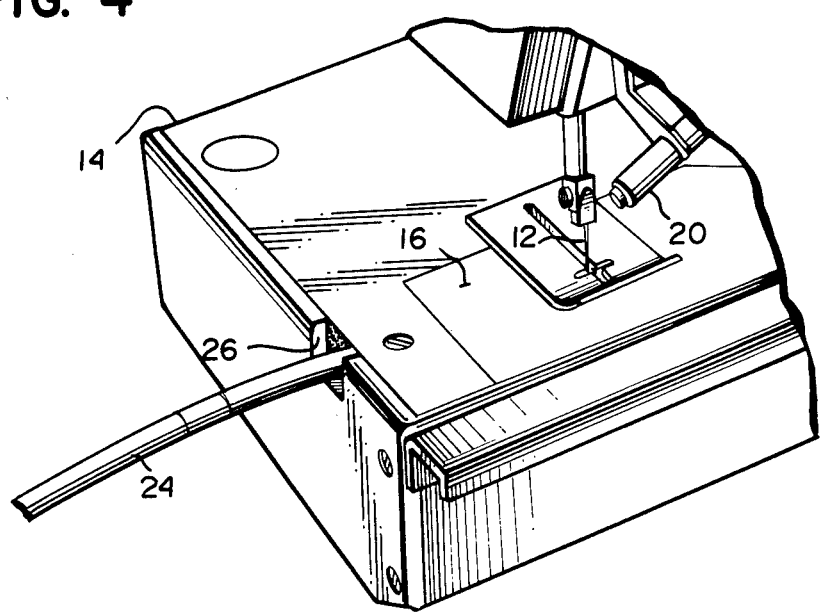
FIG. 4 is a fragmentary view of the base of a sewing machine illustrating the entry into the sewing machine base for the fiberoptics of the present invention.

This can be accomplished in a number of ways. In a preferred way, a single borescope is used and openings are provided in the bed, for example, the end opening 26 illustrated in FIG. 4, whereby the borescope can be inserted into the bed to obtain the desired viewing orientation. Alternatively, a multiple of fiberoptic bundles 24 (e.g. first, second, and third fiberoptic bundles) may be provided and fixed to the machine bed in the orientations illustrated in FIG. 3, with the opposite ends of the fiberoptic bundles terminating externally of the bed. The borescope may be an Olympus Flexible Fiberscope, Model No. IF8D3-10 with both direct and side view adaptors, sold by Olympus Corp., 4 Nevada Dr., Lake Success, N.Y. Referring to FIG. 1, each fiberoptic bundle may be connected at the end thereof external to the sewing bed and a strobe light 30 of very high intensity and very high pulse repetition rate can be provided along the two channels of the borescope to illuminate the area of the loop formation below the throat plate. The strobe light may be of the arc light type in order to obtain sufficient intensity such as that manufactured for Olympus under Model No. ALS-1230.

Attached to the remaining channel of the fiberoptics is a TV camera, monitor and recorder. The camera may be a Panasonic CCTV camera, Model No. WV-CD22, using a CCD chip (charge couple device) with its infrared filter removed to increase sensitivity to light. Any suitable video monitor and recording device may be used in association with this TV camera to record the movement of the various parts of the sewing machine and the threads, but preferably one of high resolution, having 350–600 lines per inch. Thus, the slow and stop motion capability of the video recording system permits observation of the dynamic properties of the sewing threads and elements of the sewing machine within the sewing machine bed under conditions of actual use. Thus, the loop formation which is critical for performance but whose characteristics cannot adequately be predicted from the physical properties of the threads because they are dynamic rather than static functions, may be viewed and recorded. Comparisons may be made between the actions of different threads and their performance differences noted and explained. As indicated previously, flexibility, dynamic bending modulus, lubricity, stick slip, core vs. wrapper problems, consistency, as well as range of movement, and effect of tension can all be examined versus the physical properties and the thread construction.

With reference to FIG. 5, the borescope is illustrated in association with a sewing machine using a bobbin wherein lock stitches may be viewed. The bobbin is designated 36. In this manner, the looping and release action of the thread below the throat plate in this type of machine may also be visually recorded for slow and stop motion. Thus, the dynamic test system hereof is not limited to any particular stitch formation and may be used in conjunction with sewing machines of different types to view and record the formation of various types of stitches with various types of threads.

Referring now to FIG. 6, the arm of the sewing machine just above needle 12 mounts a projecting eyelet 40 through which the needle thread 42 is threaded en route to needle 12. In accordance with the present invention, a sub-miniature load cell is disposed on the side of the sewing machine in order to measure actual thread tensions during sewing. The load cell 44 is of a type which has an extremely small mass which gives a high frequency response and does not interfere with the sewing process. Importantly, tension transients rather than average values of tension during reciprocal motion are measured. Of further significance is that this particular load cell 44 produces a signal that can be further processed inasmuch as chart recorders are not capable of following the about 7 millisecond needle stroke. The signal from this tension measuring device can be displayed on an oscilloscope and recorded on magnetic tape, played back more slowly and analyzed on a frequency analyzer. The solid-state load cell used in the present invention has very high frequency response, is small in size, has high sensitivity and may be of the type manufactured by Kulite Semiconductor and designated Model Series BG. Preferably, the tension transducer system consists of a modified Kulite sub-miniature piezoelectric load cell transducer and a Linseis strip chart recorder. The transducer provides very high frequency response, high sensitivity and minimal effect on sewing.

Thus, it will be appreciated that the objects of the present invention are fully accomplished in that the shape and quality of loop formation inside a high-speed sewing machine may be ascertained using a fiberoptics bore scope and stroboscopic video imaging system in conjunction with the measurement of the tension of the thread in a manner enabling actual tension measurements providing highly useful transient tension information rather than average tension measurements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a sewing machine having a bed, a throatplate carried by the bed for receiving a reciprocable needle and thread carried thereby, and a mechanism disposed below the throatplate for cooperating with the needle and thread to form a stitch, apparatus for viewing the region of stitch formation in the bed below the throatplate comprising:
   fiberoptic means carried by the bed for transmitting light into the region to be viewed and conveying light from said region;
   a strobe light coupled to said fiberoptic means for periodically illuminating the region through said fiberoptic means; and
   means coupled to the fiberoptic means for producing a dynamic image of the region illustrating the movement of threads when forming the stitch.

2. Apparatus according to claim 1 including means carried by and within said bed defining at least one pathway for receiving said fiber optic means for viewing said region.

3. Apparatus according to claim 2 wherein said pathway defining means includes at least two pathways, for receiving said fiberoptic means and enabling viewing the region from directions at least ninety degrees apart.

4. Apparatus according to claim 3 wherein said pathway defining means enables viewing the region from opposite sides of the needle and thread and from at least one additional direction.

5. Apparatus according to claim 1 including means carried by said bed defining at least one pathway into said bed from external of said machine for receiving said fiberoptic means for viewing said region.

6. Apparatus according to claim 1 wherein said producing means includes a video recording camera for recording the movement of the threads when forming the stitch.

7. Apparatus according to claim 6 wherein said strobe light and said video recorder are connected to said fiberoptic means externally of said sewing machine bed.

8. Apparatus according to claim 7 including means carried by and within said bed defining at least three pathways for receiving said fiberoptic means for viewing the region, at least two of said pathways enabling viewing the region from directions at least ninety degrees apart.

9. Apparatus according to claim 1 including means carried by said sewing machine for measuring tension transients on said thread during reciprocating motion of the needle carrying said thread.

10. Apparatus according to claim 9 wherein said tension measuring means comprises a load cell having a cantilevered beam in contact with the thread and serving as an electromechanical transducer.

11. A method for viewing the region of stitch formation within the bed of a sewing machine, comprising the steps of:
    disposing a first fiberoptic bundle within the bed of the sewing machine with one end thereof disposed opposite said stitch formation region;
    transmitting light from a strobe light along said first fiberoptic bundle and through said one end thereof to periodically illuminate said stitch formation region; and providing visual images of the stitch formation region from information transmitted from said region along said first fiberoptic bundle.

12. A method according to claim 11 wherein the sewing machine has a reciprocable needle for carrying a thread into the stitch formation region, including the step of measuring the tension transients on said thread caused by the action of forming the stitch using said thread.

13. A method according to claim 11 including disposing the first fiberoptic bundle such that portions thereof lie external of said sewing machine, coupling the strobe light and a visual recorder with said first fiberoptic bundle portion external to said sewing machine.

14. A method according to claim 11 including disposing a second fiber optic bundle within the bed of the sewing machine with one end disposed opposite the stitch formation region for viewing the latter from a direction, different than the direction of viewing thereof by said end of said first fiberoptic bundle.

15. A method according to claim 14 including disposing a third fiberoptic bundle within the bed of the sewing machine with one end disposed opposite the stitch formation region for viewing the latter from a direction different from both previously recited directions.

* * * * *